United States Patent [19]

Morgan et al.

[11] Patent Number: 5,552,643
[45] Date of Patent: Sep. 3, 1996

[54] POWER SIGNAL COMBINING METHOD AND APPARATUS

[75] Inventors: Jason N. Morgan, Madison; David H. Nabors, Huntsville, both of Ala.

[73] Assignee: Motorola, Inc., Schaumburg, Ill.

[21] Appl. No.: 225,019

[22] Filed: Apr. 8, 1994

[51] Int. Cl.$^6$ ................................................. H02J 3/46
[52] U.S. Cl. ............................ 307/81; 323/282; 323/285; 323/290; 307/77; 363/59
[58] Field of Search ................................ 307/81, 44, 80, 307/88, 77; 323/285, 282, 290; 363/59, 13; 361/18

[56] References Cited

U.S. PATENT DOCUMENTS

| | | | |
|---|---|---|---|
| 4,733,158 | 3/1988 | Marchione | 323/258 |
| 4,862,013 | 8/1989 | Konopka | 307/254 |
| 5,144,222 | 9/1992 | Herbert | 323/271 |
| 5,278,453 | 1/1994 | Pollmeier | 307/44 |

OTHER PUBLICATIONS

Marty Brown, "Practical Switching Power Supply Design," copyright 1990 by Academic Press, Inc., San Diego, California, especially pp. 5–6, 20–23, and 90–94.

Primary Examiner—William M. Shoop, Jr.
Assistant Examiner—Albert W. Paladini
Attorney, Agent, or Firm—Nancy R. Gamburd

[57] ABSTRACT

A buck-topology switching power supply (100) combines a plurality, n, of signals (111, 121, 131) from a like number (n) of substantially direct-current power sources by means of a single inductor (150). As k varies from 1 to n, a controller (170) acts to couple each signal$_k$ in sequence to the inductor input (140) for an "on" duty period $t_k$ at a predetermined switching frequency, f, thus forming at the inductor output (160) an output signal having an output voltage $V_o$ and an output power $P_o$. Under static load conditions, the controller holds the corresponding duty period $t_k$ for each signal$_k$ at a substantially constant value. Under dynamic load conditions, however, the controller dynamically adjusts the corresponding duty period $t_k$ in order to maintain the fractional power contribution $P_k$ for each signal$_k$ relative to the output power $P_o$ at a predetermined value.

17 Claims, 3 Drawing Sheets

100

POWER SIGNAL COMBINING METHOD AND APPARATUS

FIELD OF THE INVENTION

This application relates to switching power supplies including, but not limited to, a power signal combining method and apparatus.

BACKGROUND OF THE INVENTION

Switching power supplies are known. See, for example, Marty Brown, "Practical Switching Power Supply Design," copyright 1990 by Academic Press, Inc., 1250 Sixth Avenue, San Diego, Calif. 92101 (hereinafter "Brown"), especially pages 5–6, section 2.1, entitled "Forward-Mode Switching Regulators." It is also known that a buck regulator is a specific type of switching power supply. See, Brown, pages 20–23, section 4.2.1, entitled "The Buck Regulator Topology."

One problem in power supply design is the limit of the source driving the supply. If a power requirement is too large to be handled by any single available source, there are several alternatives including reducing the load, enhancing the source, combining multiple sources, splitting the load into multiple circuits, and increasing power supply efficiency.

In the case of combining multiple sources, it is obvious that some method must be provided to regulate the output of each source. For example, one prior method of load sharing among a plurality of power sources involves equipping each power source with a current-limiting circuit, and then combining the resulting current-limited sources to feed the single load. However, not only is this prior-art approach inefficient, but it requires additional components as well, thus adding expense.

Therefore, there is a need for an improved power signal combining method and apparatus.

DESCRIPTION OF THE PREFERRED EMBODIMENT

Briefly, in accordance with the present invention, there is disclosed a method for combining a plurality, n, of signals, the plurality of signals comprising a first signal having a first magnitude $V_1$, a second signal having a second magnitude $V_2$, ..., and an nth signal having an nth magnitude $V_n$, the method comprising the steps of, for the kth signal:

(a) coupling the kth signal to the input of an inductor, the inductor having an inductor output, for a time interval $t_k$, thereby storing an $energy_k$ in the inductor;

(b) de-coupling the kth signal from the input of the inductor, thereby allowing the $energy_k$ to dissipate at the inductor output; and, (c) repeating the coupling step (a) and the de-coupling step (b) for each of the plurality of n signals in sequence at a predetermined frequency, f, (defined hereinafter as the "switching frequency"), as k varies from 1 to n, thus forming an output signal at the inductor output, the output signal having an output voltage $V_o$ and an output power $P_o$, where each of the plurality of signals substantially comprises a direct-current power signal.

Further, in accordance with the present invention, there is also disclosed apparatus for combining a plurality, n, of signals, the plurality of signals comprising a first signal having a first magnitude $V_1$, a second signal having a second magnitude $V_2$, ..., and an nth signal having an nth magnitude $V_n$, where each of the plurality of signals substantially comprises a direct-current power signal.

Figure 1:
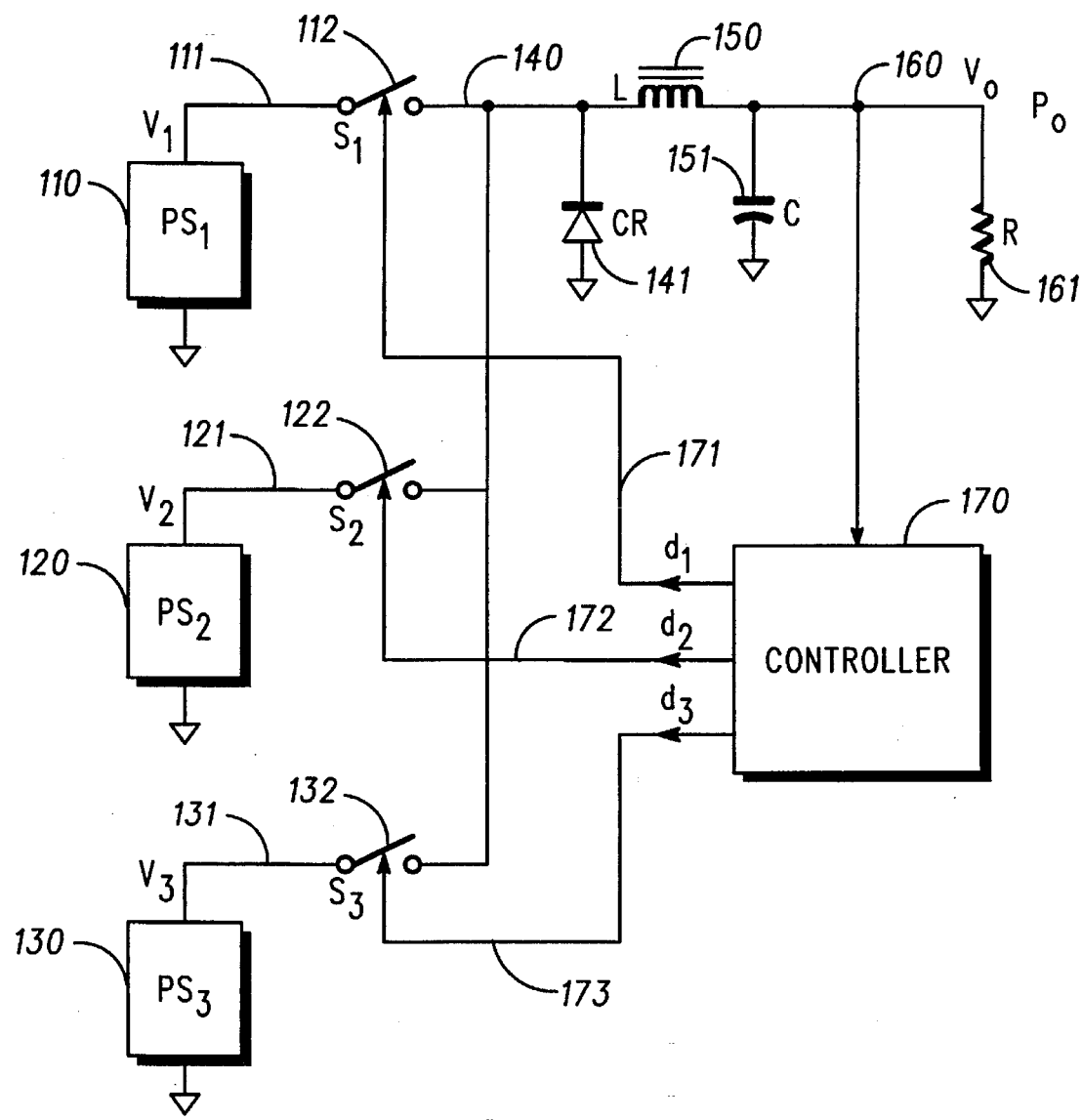
FIG. 1 is a block diagram that shows a first embodiment of a power signal combining apparatus, in accordance with the present invention. The block diagram of FIG. 1 is also suitable for demonstrating a first embodiment of a power signal combining method, in accordance with the present invention.

Referring now to FIG. 1, there is shown a buck topology switching power supply 100 comprising a first power supply $PS_1$ 110 providing a first signal $V_1$ 111, a second power supply $PS_2$ 120 providing a second signal $V_2$ 121, and a third power supply $PS_3$ 130 providing a third signal $V_3$ 131.

As shown, the power supply 100 also includes a first switch $S_1$ 112, a second switch $S_2$ 122, and a third switch $S_3$ 132; a diode CR 141; an inductor L 150, the inductor 150 including an inductor input 140 and an inductor output 160; a load resistor R 161; a controller 170; and a capacitor C 151.

It will be appreciated that the inductor output 160 forms a node (also designated as reference number 160), the node 160 including a first branch coupled to the inductor output 160, a second branch coupled to the capacitor C 151, a third branch coupled to the controller 170, and a fourth branch coupled to the load resistor 161. Moreover, the output voltage $V_o$ present across the load resistor R 161 at the node 160 forms a feed-back signal to the controller 170.

In turn, the controller 170 is arranged for controlling the first switch $S_1$, 112 by means of a first control signal $d_1$, 171; the controller 170 is further arranged for controlling the second switch $S_2$, 122 by means of a second control signal $d_2$, 172; and the controller is further arranged for controlling the third switch $S_3$ by means of a third control signal $d_3$, 173.

It will be appreciated that each switch of the plurality of switches $S_1$, $S_2$, $S_3$ is arranged to controllably couple one and only one of the plurality of signals 111, 121, 131 to the inductor input 140, respectively based on the control signals $d_1$, $d_2$, $d_3$ as provided by the controller 170. Each of the plurality of switches $S_1$, $S_2$, $S_3$ is thus arranged to momentarily operate in sequence at a predetermined switching frequency, f, for a time interval respectively designated $t_1$, $t_2$, $t_3$, thus coupling its respective signal 111, 121, 131 to the inductor input 140 for a respective time interval $t_1$, $t_2$, $t_3$.

With respect to the plurality of time intervals $t_1$, $t_2$, $t_3$, therefore, the kth time interval (where k varies from 1 to 3) may be designated as $t_k$, which therefore corresponds to the time during which the kth switch of the plurality of switches $S_1$, $S_2$, $S_3$ is operated, and further corresponds to the time during which the kth signal of the plurality of signals 111, 121, 131 is coupled to the inductor input 140. During the time $t_k$, therefore, as k varies from 1 to 3, the kth signal is coupled to the inductor input 140, thereby storing a fixed quantity of energy, designated as $energy_k$, in the inductor 150. Further, upon the expiration of $t_k$, the kth then switch releases, thereby de-coupling the kth signal from the inductor input, and thereby allowing the $energy_k$ stored therein to now dissipate at the inductor output 160.

The foregoing coupling and de-coupling process is repeated for each of the plurality of n signals in sequence at the predetermined switching frequency, f, as k varies from 1 to 3, thus forming at the inductor output 160 an output signal, the output signal having an output voltage $V_o$ and an output power $P_o$.

Moreover, as switching occurs between the plurality of power supplies 110, 120, 130, it will be appreciated that the diode CR 141 acts at least in part to regulate the current flow through the inductor L 150, while the capacitor C 151 acts at least in part to regulate the output voltage $V_o$ across the load resistor R 161.

In one embodiment, for example, the controller 170 of FIG. 1 may comprise a suitably-programmed microprocessor. In another embodiment, for example, the controller 170 may comprise the circuitry shown in FIG. 2.

Figure 2:
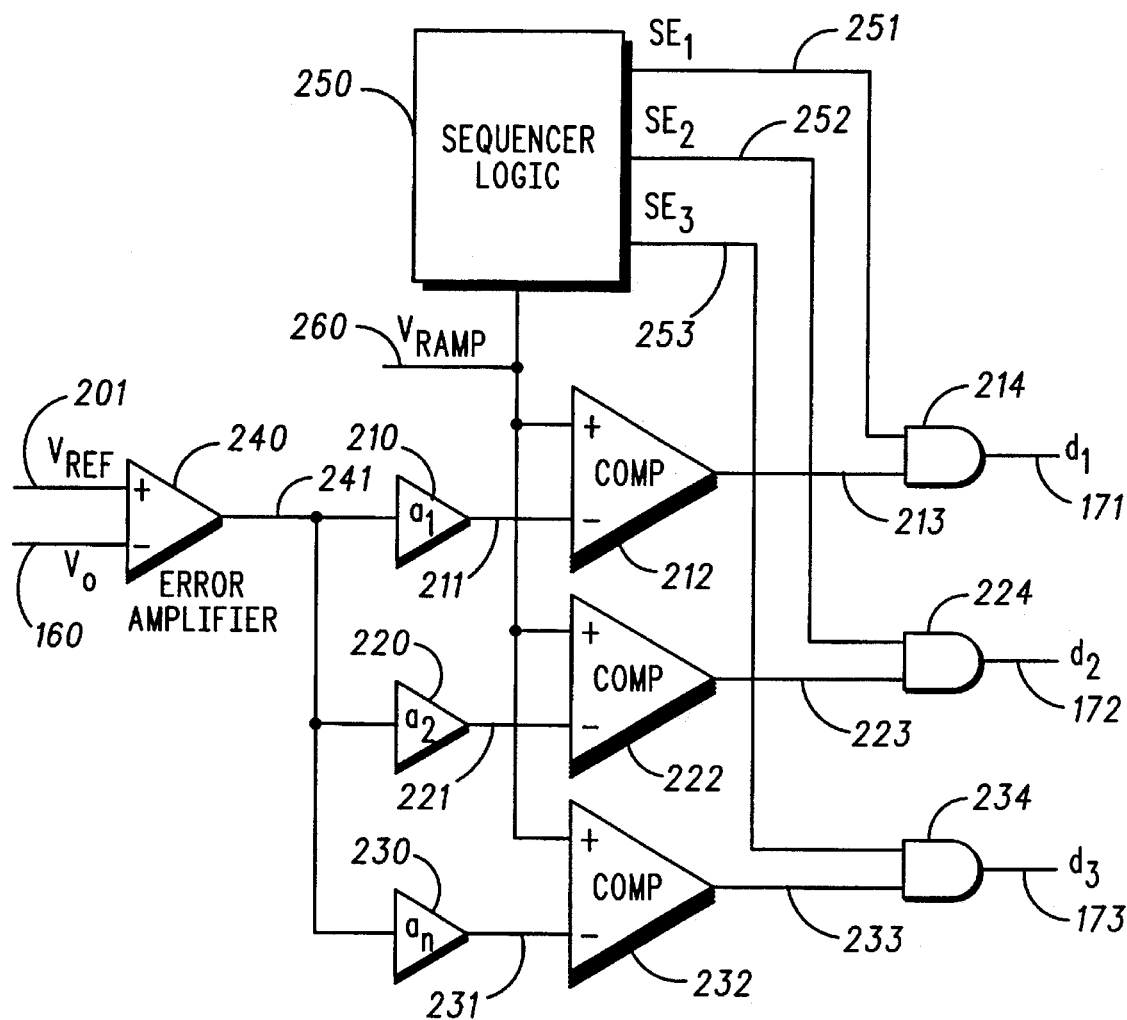
FIG. 2 shows one embodiment of a controller that may be used with FIG. 1.

Referring now to FIG. 2, the output voltage $V_o$ present at the node 160 is compared with a reference signal $V_{REF}$ 201 by means of an error amplifier 240, the amplitude of the reference signal $V_{REF}$ 201 being equal to the desired amplitude of the output voltage $V_o$ at the node 160.

Still referring to FIG. 2, the output 241 of the error amplifier 240 is scaled by a first amplifier 210 having a first gain of $a_1$. The result 211 is then compared with a timing signal $V_{RAMP}$ 260 by means of a first comparator 212. The first comparator 212 result 213 is coupled to a first AND gate 214.

As shown, the timing signal $V_{RAMP}$ 260 is also coupled to a sequencing logic circuit 250. This logic circuit 250 provides a first switch enable signal $SE_1$, a second switch enable signal $SE_2$, and a third switch enable signal $SE_3$ which signals, in turn, are coupled to the first AND gate 214, a second AND gate 224, and a third AND gate 234 respectively. The output of the first AND gate 214 forms the first switch control signal $d_1$ (reference number 171). As discussed above, the control signal $d_1$ is used to cause the switch $S_1$ to momentarily operate for the time interval $t_1$.

Similarly, the output 241 of the error amplifier 240 is scaled by a second amplifier 220 having a second gain of $a_2$. The result 221 is then compared with the signal $V_{RAMP}$ 260 by means of a second comparator 222. The second comparator 222 result 223 is coupled to the second AND gate 224. The output of the second AND gate 224 forms the second switch control signal $d_2$ (reference number 172). As discussed above, the control signal $d_2$ is used to cause the switch $S_2$ to momentarily operate for the time interval $t_2$.

Similarly, the output 241 of the error amplifier 240 is scaled by a third amplifier 230 having a third gain of $a_3$. The result 231 is then compared with the signal $V_{RAMP}$ 260 by means of third comparator 232. The third comparator 232 result 233 is coupled to the third AND gate 234. The output of the third AND gate 234 forms the third switch control signal $d_3$ (reference number 173). As discussed above, the control signal $d_3$ is used to cause the switch $S_3$ to momentarily operate for the time interval $t_3$.

In one embodiment the sequencing logic circuit 250 may comprise, for example, a suitably-programmed microprocessor.

Figure 3:
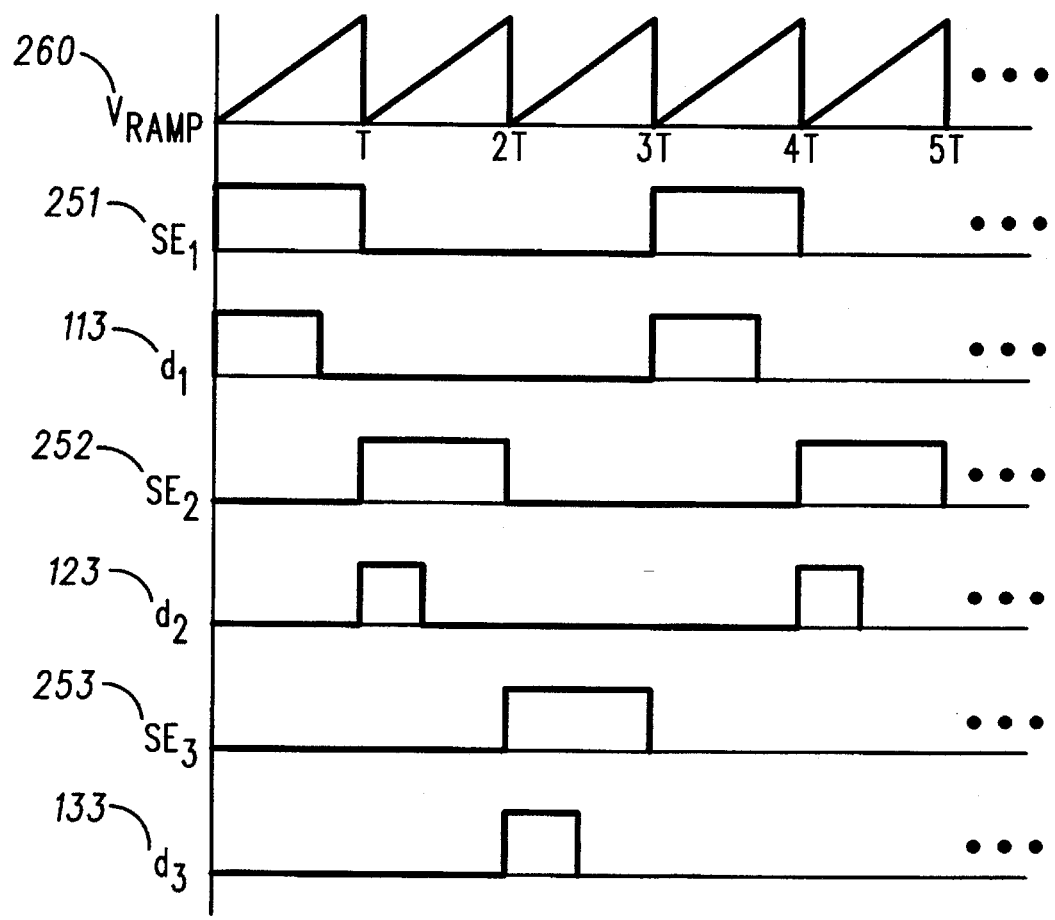
FIG. 3 is a timing diagram for various signals shown in FIGS. 1–2.

FIG. 3 depicts sample waveforms of the timing signal $V_{RAMP}$ 260, the switch enable signals $SE_1$, $SE_2$, $SE_3$, and switch control signals $d_1$, $d_2$, $d_3$ described above.

Although the power supply 100 depicted in FIG. 1 includes three (3) power signals designated 111, 121, 131, it will be appreciated that the aforementioned teachings may be equally directed to a power supply arrangement similar to the power supply 100 having a plurality, n, of signals (corresponding to the signals 111, 121, 131 in FIG. 1), the plurality of signals comprising a first Signal having a first magnitude $V_1$, a second signal having a second magnitude $V_2, \ldots$, and an nth signal having an nth magnitude $V_n$, the power supply arrangement including an inductor (corresponding to the inductor 150 in FIG. 1) having an inductor input (corresponding to element 140 in FIG. 1) and an inductor output (corresponding to element 160 in FIG. 1), a plurality n of switches (corresponding to the switches 112, 122, 132 respectively in FIG. 1), each switch being arranged to controllably couple one and only one of the plurality of n signals to the inductor input, each switch being arranged to momentarily operate in sequence at the predetermined switching frequency, f, thus, for the kth signal, as k varies from 1 to n, first coupling the kth signal to the inductor input for a time interval $t_k$, thereby storing an energy$_k$ in the inductor, and then de-coupling the kth signal from the inductor input, thereby allowing the energy$_k$ to dissipate at the inductor output 160, thus forming an output signal at the inductor output, the output signal having an output voltage $V_o$ and an output power $P_o$.

Moreover, it will be appreciated that the input power source signals depicted in FIG. 1 as signals 111, 121, and 131 may be generally characterized as a plurality of n substantially direct-current power signals, each signal magnitude $V_1, V_2, \ldots, V_n$, being greater than the required load voltage $V_o$. Further, the inductor L may be characterized as having an inductance value determined by the switching period T (where T is the reciprocal of the switching frequency, f; thus, T=1/f) and the energy requirements of the load 161.

Further, each of the plurality of n input power signals may be characterized as comprising a predetermined fractional power contribution $p_k$, where k varies from 1 to n, each $p_k$ being a predetermined fraction of the load power requirement $P_o$. Thus, the first input power signal comprises a first fractional power contribution $p_1$, the second input power signal comprises a second fractional power contribution $p_2$, $\ldots$, and the nth input power signal comprises an nth fractional power contribution $p_n$.

Moreover, the "on time" for the kth source switch, $t_k$, defined as the time period during which the kth switch operates to couple the kth signal source to the inductor 150, during which time the kth signal source thus causes current to flow in the inductor 150, thereby transferring energy from the kth signal source to the inductor 150, thereby to be momentarily stored therein, may be determined by Equation 1 below:

$$t_k = \sqrt{\frac{2 p_k P_o L n T}{(V_k - V_o)^2}}, \quad \text{(Equation 1)}$$

where:

T=1/f, $p_k$=the predetermined fractional power contribution for the kth signal, $P_o$=the output power;

L=the value of the inductor, $V_k$=the magnitude of the kth signal;

and L and f are chosen so that each $t_k$ is less than T.

The relative scaling coefficients for each feedback loop, $a_k$, are given by the $t_k$ values above using Equation 2, as follows:

$$a_k = \frac{t_k}{T}. \quad \text{(Equation 2)}$$

It will be appreciated that the particular embodiment of a power signal combing method and apparatus, in accordance with the present invention, as disclosed in FIGS. 1–3 acts to combine power from several sources 110, 120, and 130 to supply predetermined fractions of the required load power, $P_o$. In this embodiment, therefore, a buck topology power supply is used with the controller 170 to cause the switching of each of the source power signals 111, 121, and 131 in sequence for equal time intervals, equal to the switching period, T. As shown in FIG. 2, to provide feedback control, the output voltage $V_o$ present at the node 160 is compared to a reference voltage $V_{REF}$ 201 to obtain an error signal 241. This error signal 241 is then scaled by a constant factor $a_1$, $a_2$, $a_3$, correspondingly unique to each particular source 110, 120, and 130. The corresponding results 211, 221, 231 are then compared to the ramp signal $V_{RAMP}$ 260 by means of the comparators 212, 222, 232, the outputs of which controls the switches 112, 122, 132 associated with each particular source during its allotted time period. As above, various waveforms are shown in FIG. 3. It should be noted that in this embodiment, this feedback control process is in constant operation, but that the information associated with each source is only valid during its enabled state.

Moreover, it will be appreciated that FIGS. 1–3 generally disclose apparatus for combining a plurality of signals, the plurality of signals comprising the first signal 111 having a first magnitude $V_1$, the second signal 121 having a second magnitude $V_2$, and the third signal 131 having a third magnitude $V_3$. The apparatus comprises the following components:

To begin, the apparatus includes the inductor L 150, the inductor including an inductor input 140 and an inductor output 160.

The apparatus further comprises the plurality of switches 112, 122, 132, each switch arranged to controllably couple one and only one of the plurality of n signals to the inductor input 140.

The apparatus further includes the control means 170 coupled to the switches 112, 122, 132 by means of the switch control signals $d_1$ (reference number 171), $d_2$ (reference number 172), $d_3$ (reference number 173), for causing the momentary operation of each of the plurality of switches in sequence at the predetermined switching frequency, f. As a result, for each of the signals 111, 121, 131, each signal is first coupled to the inductor input 140 for a time interval $t_k$, where k varies from 1 to 3, thereby storing an energy designated as energy$_k$ in the inductor L 150, after which the signal is de-coupled from the inductor input 140, thereby allowing the aforementioned energy$_k$ to dissipate at the inductor output 160. As a result of this process, there is formed an output signal at the inductor output 160, the output signal having an output voltage $V_o$ and an output power $P_o$.

Further, for each signal of the plurality of signals 111, 121, 131, the combined time during which the respective signal energy is stored in the inductor 150 and during which the respective signal energy is dissipated at the inductor output is the predetermined switching period, T, where T=1/f.

Further, each of the plurality of signals 111, 121, 131 respectively provides a predetermined fractional power contribution $p_1$, $p_2$, $p_3$ to the output power $p_o$.

Further, for each of the plurality of signals 111, 121, 131, the time interval for coupling the signal to the inductor input 140 is based on Equation 1, above.

Although each of the plurality of signals 111, 121, 131 has been described herein as substantially comprising a direct-current power signal, it will be appreciated that, in an alternate embodiment, the teachings of the present invention may be applied to an arrangement for combining a plurality of signals, wherein one or more of the plurality of signals does NOT substantially comprise a direct-current power signal.

The aforementioned teachings are further demonstrated by the following example.

Referring again to FIGS. 1–2, assume that it is desired to provide an output voltage value across R 161 of 5.0 volts (thus, $V_o$=5 V) at an output power of 10.0 Watts (thus, $P_o$=10 W) based on the three power supplies 110, 120, and 130 (thus, n=3). A switching frequency, f, of 20 KHz is chosen, giving a switching period, T, equal to $$\frac{1}{20 \text{ KHz}} = 50 \text{ microseconds.}$$

Using well-known switching power supply design methods (see, for example, Brown, above, pages 90–94, section 6.4, entitled "The Forward-Mode Filter Choke") as applied to the dominant (in power) of the three sources 110, 120, and 130, the value of the inductor L 150 is determined as 2.5 micro-Henry ($2.5 \times 10^{-6}$ H).

First, assume the first power supply 110 is a 24.0 source (thus, $V_1$=24) which will provide 80% of the output power $P_o$ (thus, $p_1$=0.8). Therefore, using Equation 1 above, $$t_1 = \sqrt{\frac{2(0.8)(10.0)(2.5 \times 10^{-6})(3)(50 \times 10^{-6})}{(24-5)^2}} = 4.08 \times 10^{-6} \text{ sec.,}$$

which is less than the switching period, T ($50 \times 10^{-6}$ seconds). Further, the scale factor $a_1$ for the amplifier 210 in FIG. 2 may be computed using Equation 2 above, as follows:

$$a_1 = \frac{4.08 \times 10^{-6}}{50 \times 10^{-6}} = 0.082.$$

Second, still referring to FIGS. 1–2, assume the second power supply 120 is a 12.0 volt source (thus, $V_2$=12 V) which will provide 15% of the output power $P_o$ (thus, $p_2$=0.15). Therefore, again using Equation 1 above, $$t_2 = \sqrt{\frac{2(0.15)(10.0)(2.5 \times 10^{-6})(3)(50 \times 10^{-6})}{(12-5)^2}} = 4.79 \times 10^{-6} \text{ sec.,}$$

which is less than the switching period, T ($50 \times 10^{-6}$ seconds). Further, the scale factor $a_2$ for the amplifier 220 in FIG. 2 may be computed using Equation 2 above, as follows:

$$a_2 = \frac{4.79 \times 10^{-6}}{50 \times 10^{-6}} = 0.096.$$

Third, still referring to FIGS. 1–2, assume the third power supply 130 is a 7.0 volt source (thus, $V_3$=7 V) which will provide 5% of the output power $P_o$ (thus, $p_3$=0.05). Therefore, again using Equation 1 above, $$t_3 = \sqrt{\frac{2(0.05)(10.0)(2.5 \times 10^{-6})(3)(50 \times 10^{-6})}{(7-5)^2}} = 9.68 \times 10^{-6} \text{ sec.,}$$

which is less than the switching period, T ($50 \times 10^{-6}$ seconds). Further, the scale factor $a_3$ for the amplifier 230 in FIG. 2 may be computed using Equation 2 above, as follows:

$$a_3 = \frac{9.68 \times 10^{-6}}{50 \times 10^{-6}} = 0.194.$$

Thus, there is disclosed a buck-topology switching power supply 100 which combines a plurality, n, of signals 111, 121, 131 from a like number (n) of substantially direct-current power sources 110, 120, 130 by means of a single inductor 150. As k varies from 1 to n, the controller 170 acts to couple each signal$_k$ in sequence to the inductor input 140 for an "on" duty period t$_k$ at a predetermined switching frequency, f. There is thus formed at the inductor output 160 an output signal having an output voltage V$_o$ and an output power P$_o$. Under static load conditions, the controller 170 holds the corresponding duty period t$_k$ for each signal$_k$ at a substantially constant value. Under dynamic load conditions, however, the controller 170 dynamically adjusts the corresponding duty period t$_k$ in order to maintain the fractional power contribution P$_k$ for each signal$_k$ relative to the output power P$_o$ at a predetermined value.

One key advantage of a power signal combining method and apparatus, in accordance with the present invention, when compared to the prior art, is that the present invention eliminates the need for current-limiting circuits normally associated with prior-art type load sharing supplies.

Further, a power signal combining method and apparatus, in accordance with the present invention, requires only one regulating inductor, capacitor, and diode, regardless of the number of power signals that are being combined. In contrast, the prior art current-limiting load-sharing arrangement required a regulating inductor, capacitor, and diode for each individual power signal. As a result, the present invention requires substantially fewer components than the prior art, thus resulting in substantial cost savings.

A still further advantage of a power signal combining method and apparatus, in accordance with the present invention, is that the fractional power contribution for each power supply is regulated, even under dynamic load conditions. In contrast, the prior art current-limiting arrangement is incapable of regulating the fractional power contribution for the individual power supplies. As a result, the present invention provides more efficient load sharing among the individual power supplies.

While various embodiments of a power signal combining method and apparatus, in accordance with the present invention, have been described hereinabove, the scope of the invention is defined by the following claims.

What is claimed is:

1. A method for applying a plurality, k, of signals, (where k sequentially assumes each value from 1 to n) plurality of signals comprising a first signal having a first magnitude V$_1$, a second signal having a second magnitude V$_2$, . . . , and an nth signal having an nth magnitude V$_n$, the method comprising the steps of, for the kth signal:

(a) coupling the kth signal to the input of an inductor, the inductor having an inductor output, for a time interval t$_k$, thereby storing an energy$_k$ in the inductor, the time interval t$_k$ based on $t_k=((2 p_k P_o L n T)/(V_k-V_o)^2)^{1/2}$;

(b) de-coupling the kth signal from the input of the inductor, thereby allowing the energy$_k$ to dissipate at the inductor output; and, (c) repeating the coupling step (a) and the de-coupling step (b) for each of the plurality of n signals in sequence at a predetermined frequency, f, as k varies from 1 to n, thus forming an output signal at the inductor output, the output signal having an output voltage V$_o$ and an output power P$_o$;

where:

T=1/f

P$_k$=a predetermined fractional power contribution for the kth signal.

L=a value of the inductor,

V$_k$=a magnitude of the kth signal;

and L and f are chosen so that each t$_k$ is less than T.

2. The method of claim 1, where each of the plurality of signals consisting of the first signal, the second signal, . . . , the kth (where k sequentially assumes each value from 1 to n) signal, provides the predetermined fractional power contribution to the output power P$_o$.

3. The method of claim 2, where each of the plurality of signals consisting of the first signal, the second signal, . . . , the nth signal, substantially comprises a direct-current power signal.

4. The method of claim 3, where n=3.

5. Apparatus for applying a plurality, k, of signals, (where k sequentially assumes each value from 1 to n) the plurality of signals comprising a first signal having a first magnitude V$_1$, a second signal having a second magnitude V$_2$, . . . , and an nth signal having an nth magnitude V$_n$, the apparatus comprising:

an inductor having an inductor input and an inductor output;

a plurality n of switches, each switch arranged to controllably couple one and only one of the plurality of n signals to the inductor input; and control means for momentarily operating each of the plurality of n switches in sequence at a predetermined frequency, f, thus, for the kth signal, as k varies from 1 to n, first coupling the kth signal to the inductor input for a time interval t$_k$, thereby storing an energy$_k$ in the inductor, and then de-coupling the kth signal from the inductor input, thereby allowing the energy$_k$ to dissipate at the inductor output, thus forming an output signal at the inductor output, the output signal having an output voltage V$_o$ and an output power P$_o$ in which the time interval t$_k$ is based on $t_k=((2 p_k P_o L n T)/(V^k-V_o)^2)^{1/2}$ where:

T=1/f p$_k$=a predetermined fractional power contribution for the kth signal,

L=a value of the inductor,

V$_k$=a magnitude of the kth signal:

and L and f are chosen so that each t$_k$ is less than T.

6. The apparatus of claim 5, where each of the plurality of signals consisting of the first signal, the second signal, . . . , the nth signal, provides the predetermined fractional power contribution to the output power P$_o$.

7. The apparatus of claim 6, where each of the plurality of signals consisting of the first signal, the second signal, . . . , the nth signal, substantially comprises a direct-current power signal.

8. The apparatus of claim 7, where n=3.

9. Apparatus for applying a plurality, k, of signals, (where k sequentially assumes each value from 1 to n) the plurality of signals comprising a first signal having a first magnitude V$_1$, a second signal having a second magnitude V$_2$, . . . , and an nth signal having an nth magnitude V$_n$, the apparatus comprising:

an inductor having an inductor input and an inductor output;

a plurality n of switches, each switch arranged to controllably couple one and only one of the plurality of n signals to the inductor input; and each of the plurality of n switches being arranged to momentarily operate in sequence at a predetermined frequency, f, thus, for the kth signal, as k varies from 1 to n, first coupling the kth signal to the inductor input for a time interval t$_k$, thereby storing an energy$_k$ in the inductor, and then de-coupling the kth signal from the inductor input, thereby allowing the energy$_k$ to dissipate at the inductor output, thus forming an output signal at the inductor output, the output signal having an output voltage $V_o$ and an output power $P_o$ in which the time interval $t_k$ is based on $t_k=((2\ p_k\ P_o\ L\ n\ T)/(V^k-V_o)^2)^{1/2}$ where:

$T=1/f$ $p_k$=a predetermined fractional power contribution for the kth signal, $L$=a value of the inductor, $V_k$=a magnitude of the kth signal;

and $L$ and $f$ are chosen so that each $t_k$ is less than $T$.

10. The apparatus of claim 9, where each of the plurality of signals consisting of the first signal, the second signal, . . . , the nth signal, provides the predetermined fractional power contribution to the output power $P_o$.

11. The apparatus of claim 9, where each of the plurality of signals consisting of the first signal, the second signal, . . . , the nth signal, substantially comprises a direct-current power signal.

12. The apparatus of claim 11, where n=3.

13. In an arrangement including a plurality, k, of signals, (where k sequentially assumes each value from 1 to n) the plurality of signals comprising a first signal having a first magnitude $V_1$, a second signal having a second magnitude $V_2$, and an nth signal having an nth magnitude $V_n$, the arrangement including an inductor having an inductor input and an inductor output, a plurality n of switches, each switch arranged to controllably couple one and only one of the plurality of n signals to the inductor input, a method for combining the plurality of n signals, the method comprising the steps of:

momentarily operating in sequence at a predetermined frequency, f, each of the plurality of n switches thus, for the kth signal, as k varies from 1 to n, first coupling the kth signal to the inductor input for a time interval $t_k$, thereby storing an energy$_k$ in the inductor, and then de-coupling the kth signal from the inductor input, thereby allowing the energy$_k$ to dissipate at the inductor output, thus forming an output signal at the inductor output, the output signal having an output voltage $V_o$ and an output power $P_o$, in which the time interval $t_k$ is based on $t_k=((2\ p_k\ L\ n\ T)/(V_k-V_o)^2)^{1/2}$ where:

$T=1/f$ $p_k$=a predetermined fractional power contribution for the kth signal, $L$=a value of the inductor, $V_k$=a magnitude of the kth signal;

and $L$ and $f$ are chosen so that each $t_k$ is less than $T$.

14. The method of claim 13, where each of the plurality of signals consisting of the first signal, the second signal, . . . , the nth signal, provides the predetermined fractional power contribution to the output power $P_o$.

15. The method of claim 13, where each of the plurality of signals consisting of the first signal, the second signal, . . . , the nth signal, substantially comprises a direct-current power signal.

16. The method of claim 15, where n=3.

17. A buck-topology switching power supply arranged to combine a plurality, n, of signals from a like number of substantially direct-current power sources by means of a single inductor, the single inductor having an inductor input and an inductor output, the buck-topology switching power supply further including a controller arranged so that, as k varies from 1 to n, each signal$_k$ is coupled in sequence to the inductor input for a duty period $t_k$ at a predetermined frequency, f, thus forming at the inductor output an output signal having an output voltage $V_o$ and an output power $P_o$, the controller further arranged so that each signal$_k$ provides a predetermined fractional power contribution to the output power $P_o$ and in which the duty period $t_k$ is based on $t_k=((2\ p_k\ P_o\ L\ n\ T)/(V_k-V_o)^2)^{1/2}$ where:

$T=1/f$ $p_k$=a predetermined fractional power contribution for the kth signal, $L$=the value of the inductor, $V_k$=the magnitude of the kth signal;

and $L$ and $f$ are chosen so that each $t_k$ is less than $T$.

* * * * *

UNITED STATES PATENT AND TRADEMARK OFFICE
CERTIFICATE OF CORRECTION

PATENT NO. : 5,552,643
DATED : September 3, 1996
INVENTOR(S) : Jason N. Morgan, David H. Nabors Page 1 of 1

It is certified that error appears in the above-identified patent and that said Letters Patent is hereby corrected as shown below:

Column 7, Claim 1,
Line 41, after the word "n)" insert -- the -- before the word "plurality".

Signed and Sealed this

Twenty-eighth Day of August, 2001

Attest:

*Attesting Officer*

NICHOLAS P. GODICI
*Acting Director of the United States Patent and Trademark Office*